US012646374B2

(12) United States Patent
Nelson et al.

(10) Patent No.: US 12,646,374 B2
(45) Date of Patent: Jun. 2, 2026

(54) MODIFYING DESIGNATED PLAYING CARDS EMPLOYED IN ELECTRONIC TABLE GAMES

(71) Applicant: IGT, Las Vegas, NV (US)

(72) Inventors: Dwayne R. Nelson, Las Vegas, NV (US); Patrick Danielson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 288 days.

(21) Appl. No.: 18/375,822

(22) Filed: Oct. 2, 2023

(65) Prior Publication Data

US 2025/0111739 A1 Apr. 3, 2025

(51) Int. Cl.
*G07F 17/32* (2006.01)

(52) U.S. Cl.
CPC ...... *G07F 17/3225* (2013.01); *G07F 17/3211* (2013.01); *G07F 17/3293* (2013.01)

(58) Field of Classification Search
None
See application file for complete search history.

(56) References Cited

U.S. PATENT DOCUMENTS

| | | | | |
|---|---|---|---|---|
| 8,087,983 | B2 | 1/2012 | Longway | |
| 8,192,277 | B2 | 6/2012 | Soltys et al. | |
| 8,272,945 | B2 | 9/2012 | Kelly et al. | |
| 8,348,747 | B2 | 1/2013 | Arezina et al. | |
| 8,521,166 | B2 | 8/2013 | Kang et al. | |
| 8,734,245 | B2 | 5/2014 | Kelly et al. | |
| 9,292,996 | B2 | 3/2016 | Davis et al. | |
| 9,472,047 | B2 | 10/2016 | Hilbert et al. | |
| 10,304,281 | B2 | 5/2019 | Morin | |
| 10,311,681 | B2 | 6/2019 | Litman | |
| 10,427,027 | B2 | 10/2019 | Takacs et al. | |
| 10,964,157 | B2 | 3/2021 | Morin | |
| 11,210,906 | B2 | 12/2021 | Weaver et al. | |
| 11,354,972 | B2 | 6/2022 | Chun et al. | |
| 11,727,753 | B2 | 8/2023 | Maya et al. | |
| 2007/0287535 | A1* | 12/2007 | Soltys | A63F 3/00157 463/29 |
| 2009/0118006 | A1 | 5/2009 | Kelly et al. | |
| 2012/0157193 | A1 | 6/2012 | Arezina et al. | |
| 2017/0316654 | A1* | 11/2017 | Holsclaw | G07F 17/3241 |
| 2018/0276951 | A1 | 9/2018 | Litman | |
| 2021/0158647 | A1* | 5/2021 | Morin | G07F 17/322 |
| 2024/0404353 | A1* | 12/2024 | Dominelli | G07F 17/3206 |

* cited by examiner

*Primary Examiner* — Ronald Laneau
(74) *Attorney, Agent, or Firm* — Neal, Gerber & Eisenberg LLP

(57) ABSTRACT

Gaming systems and methods which employ designated playing cards in association with an electronic table game.

20 Claims, 4 Drawing Sheets

400

MODIFYING DESIGNATED PLAYING CARDS EMPLOYED IN ELECTRONIC TABLE GAMES

CROSS-REFERENCE TO RELATED APPLICATION

This application is related to the following commonly owned co-pending patent application: U.S. application Ser. No. 18/375,838, entitled "MODIFYING DESIGNATED PLAYING CARDS EMPLOYED IN ELECTRONIC TABLE GAMES WITH OVERLAID BONUS EVENTS,".

BACKGROUND

In various embodiments, the systems and methods of the present disclosure employ designated playing cards in association with an electronic table game.

Electronic table games combine certain elements, such as a live dealer and physical table game elements, with electronic interfaces for managing wagers. Electronic table games offer electronic versions of table games such as blackjack, roulette, baccarat, and three-card poker.

BRIEF SUMMARY

In certain embodiments, the present disclosure relates to a system including a processor, and a memory device that stores a plurality of instructions. When executed by the processor following a plurality of physical playing cards dealt in association with a play of a game at a gaming table, the instructions cause the processor to capture visual data associated with the plurality of physical playing cards dealt at the gaming table. When executed by the processor responsive to the plurality of physical playing cards including a designated physical playing card associated with a plurality of first attributes, for a first gaming terminal remote from the gaming table, the instructions cause the processor to select one first attribute of the plurality of first attributes of the designated physical playing card, modify the captured visual data based on the one selected first attribute of the plurality of first attributes, and communicate the modified captured visual data to the first gaming terminal. In these embodiments, responsive to receipt of the modified captured visual data, the first gaming terminal causes a display, by a display device and in association with the play of the game at the gaming table, of an image of the designated physical playing card associated with the one selected first attribute.

In certain embodiments, the present disclosure relates to a system including a processor, and a memory device that stores a plurality of instructions. When executed by the processor following a plurality of physical playing cards dealt in association with a play of a game at a gaming table and responsive to the plurality of dealt physical playing cards including a physical playing card having a plurality of ranks, the instructions cause the processor to select one rank of the plurality of ranks of that physical playing card, and communicate data to a gaming terminal remote from the gaming table. In these embodiments, responsive to receipt of the data, the gaming terminal causes a display, by a display device and in association with the play of the game at the gaming table, of an image of that physical playing card displaying the selected rank without displaying any non-selected rank of the plurality of ranks.

In certain embodiments, the present disclosure relates to a method of operating a system. Following a plurality of physical playing cards dealt in association with a play of a game at a gaming table, the method includes capturing visual data associated with the plurality of physical playing cards dealt at the gaming table. Responsive to the plurality of physical playing cards including a designated physical playing card associated with a plurality of first attributes, for a first gaming terminal remote from the gaming table, the method includes selecting, by a processor, one first attribute of the plurality of first attributes of the designated physical playing card, modifying, by the processor, the captured visual data based on the one selected first attribute of the plurality of first attributes, and communicating the modified captured visual data to the first gaming terminal. In these embodiments, responsive to receipt of the modified captured visual data, the first gaming terminal causes a display, by a display device and in association with the play of the game at the gaming table, of an image of the designated physical playing card associated with the one selected first attribute.

Additional features are described herein, and will be apparent from the following Detailed Description and the figures.

DETAILED DESCRIPTION

Figure 1:
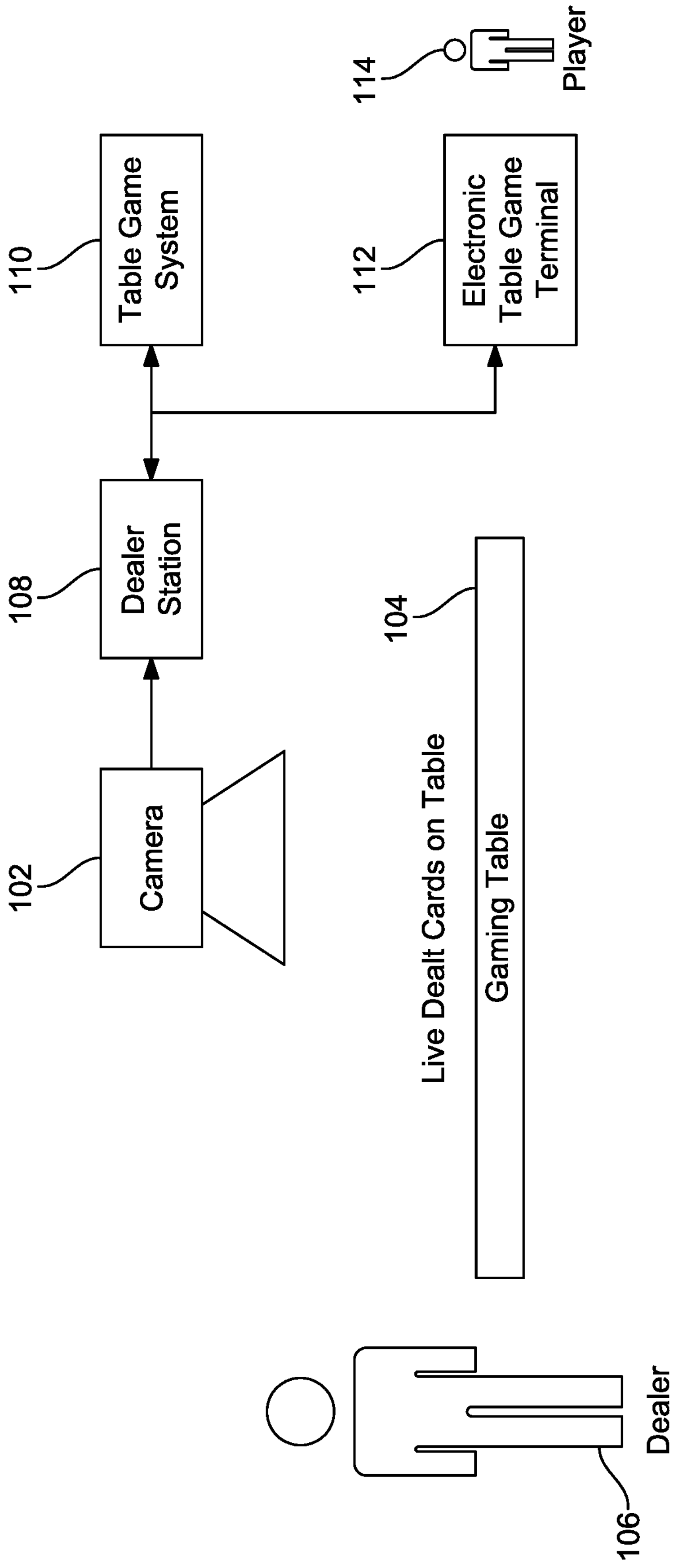
FIG. 1 is an example configuration of the architecture of a plurality of different components of the system of the present disclosure

In various embodiments, the present disclosure relates generally to systems and methods which employ designated playing cards in association with an electronic table game.

In certain embodiments, the system captures one or more images and/or videos of a game including one or more playing cards being played at a gaming table. The system additionally streams data associated with part or all of the captured images and/or videos to one or more gaming terminals. In these embodiments, prior to displaying part or all of the captured images and/or videos at one or more gaming terminals, if any of the playing cards dealt at the gaming table qualify as designated playing cards, the system modifies how such playing cards are displayed by one or more gaming terminals and/or how such playing cards function at one or more gaming terminals. That is, responsive to an occurrence of a playing card modification event, the system causes a playing card having a first set of characteristics to be displayed as having a second, different set of characteristics such that the player at the gaming terminal is displayed a somewhat different playing card than the playing card dealt at the gaming table. For example, following a dealer at a gaming table dealing a blank playing card (i.e., a designated playing card) in association with the play of the table game occurring at the gaming table and following the system capturing video of the blank playing card, the system determines that the blank playing card qualifies to be modified. In this example, the system determines to modify the blank playing card to a bonus playing card (i.e., changes one or more attributes of the designated playing card) for one or more gaming terminals. In doing so, the system modifies the captured image of the blank playing card to an image of a bonus playing card and causes the gaming terminal to display the bonus playing card instead of the blank playing card. In this example, such a modification of the blank playing card to a bonus playing card modifies how the play of the game proceeds at the gaming terminal receiving the stream (which may be different than or the same as how the play of the game proceeds at the gaming table and/or other gaming terminals also receiving the stream).

In certain embodiments, the system employs one or more dedicated designated playing cards. In these embodiments, if such a dedicated designated playing card is dealt at the gaming table, the system determines one or more attributes of that designated playing card to display as part of the game streamed to one or more gaming terminals. For example, a playing card that does not have any rank or suit but only shows a machine-readable code, such as a QR code, qualifies as a dedicated designated playing card because such a playing card cannot be employed during the play of the game displayed by the gaming terminal. In this example, the system reading the machine-readable code triggers the system to determine one or more attributes of that designated playing card, such as determining one or more ranks of that playing card, one or more suits of that playing card and/or one or more features activated based on that playing card.

In certain embodiments, the system employs one or more non-dedicated designated playing cards. In these embodiments, if such a non-dedicated designated playing card is dealt at the gaming table, the system may or may not modify one or more existing attributes of that designated playing card to one or more new attributes for display as part of the game streamed to one or more gaming terminals. For example, a playing card having a rank and suit that otherwise can be employed during the play of the game displayed by the gaming terminal qualifies as a non-dedicated designated playing card. In this example, upon the system determining to modify such a playing card, the system modifies one or more attributes of that playing card, such as adding to (or substituting for) the rank of that playing card, adding to (or substituting for) the value of that playing card or adding one or more features activated based on that playing card.

Accordingly, the system of the present disclosure modifies one or more states of a game being played at a gaming table and streamed to one or more gaming terminals to personalize how different users at different gaming terminals interact with the system. Such an increased level of personalization offered via the modification of how certain physical elements are virtually displayed provides an improvement over prior systems and how they statically operated.

While certain embodiments described below are directed to a primary game, such as a wagering game, played at a gaming table and streamed to one or more gaming terminals, it should be appreciated that such embodiments may additionally or alternatively be employed in association with a secondary game, such as a bonus game played at a gaming table, a communal game played at one or more gaming tables, and/or a tournament game played at one or more gaming tables. In certain such embodiments, the secondary game occurs based on a displayed event associated with a play of a primary game. In certain other embodiments, the secondary game occurs based on an event independent of any displayed event associated with the play of the primary game.

In certain embodiments, following an initiation of a play of a game at a gaming table and the dealing of one or more playing cards at the gaming table, the system captures one or more images of one or more dealt playing cards. In these embodiments, since the play of the game occurring at the gaming table is being viewed by participating players remote from the gaming table (which overcomes the problems with a limited amount of space around a gaming table and thus a limited amount of players that can participate in a play of a game occurring at a gaming table), the system operates to capture certain data, such as image data and/or video data, of the physical elements at the gaming table. In different embodiments, the play of the card game at the gaming table include any suitable card game including any suitable type of poker game, such as, but not limited to, a multiple hand poker game, Texas Hold'em, Omaha, Three Card Poker, Four Card Poker, Seven Card Stud, Pai Gow Poker, Caribbean Stud Poker, or Let It Ride Poker, as well as other suitable non-poker interactive cards games, such as, but not limited to, blackjack, Baccarat, Spanish 21, Casino War, Super Fun 21, or Vegas Three Card Rummy.

In certain embodiments, the system employs one or more image capture devices, such as one or more cameras of the gaming table and/or one or more cameras separate from, but associated with, the gaming table, to capture such images (and/or video). For example, as seen in FIG. 1, the system employs one or more cameras 102 associated with a gaming table 104 to capture data of the playing cards being dealt at the gaming table by a dealer 106. In this example, the data captured by the camera associated with the gaming table is communicated to a dealer station 108 (to enable gaming establishment personnel to monitor the captured images) in communication with a table game system 110 (which stores such data for various purposes, such as accounting purposes, regulatory purposes and authentication/validation purposes). In addition to the captured data being used by the dealer station and the table game systems, the captured data is communicated to an electronic table game terminal 112 associated with a player 114 remotely participating in the play of the table game. In certain embodiments (not shown), in addition to capturing one or more images (and/or video), the system employs one or more sound capture devices, such as microphones, of the gaming table and/or one or more sound capture devices separate from, but associated with, the gaming table.

It should be appreciated that in different embodiments, the system employs one or more gaming table components utilized to modify one or more parameters of a play of a table game displayed to one or more gaming terminals. In certain such embodiment, the gaming table component is part of or otherwise associated with any suitable intelligent gaming table which facilitates the play of a table game, any suitable virtual gaming table which facilitates the play of a table game and/or any suitable component associated with a non-intelligent gaming table which facilitates the play of a table game. In one such embodiment, the gaming table component is part of or otherwise associated with an intelligent gaming table which enables one or more players to play one or more suitable games by placing one or more wagers utilizing gaming chips. In this embodiment, the gaming table component includes zero, one or more input devices (e.g., a camera to capture video of the physical game elements employed for the play of the game at the gaming table) and zero, one or more display devices. In another such embodiment, the gaming table is a non-intelligent gaming table including a suitable support structure, such as one or more legs, a playing surface and a dealer position. In this embodiment, the gaming table component is separate from but associated with the gaming table and includes zero, one or more input devices (e.g., a camera to capture video of the physical game elements employed for the play of the game at the gaming table) and zero, one or more display devices.

In certain embodiments, the gaming table component utilized to modify one or more parameters of a play of a table game displayed to one or more gaming terminals additionally includes or is otherwise associated with a communication interface (e.g., to communicate data regarding the play of the game at the gaming table to a gaming terminal). In certain of these embodiments, the system disclosed herein utilizes zero, one or more video cameras which capture the live action of the gaming table and zero, one or more video processing servers which process and stream the captured video to any suitable gaming terminal which displays one or more table games being played at a gaming table (such as, but not limited to, a terminal associated with an electronic table game, a slot machine operable to additionally display one or more table games being played at a gaming table, a video poker machine operable to additionally display one or more table games being played at a gaming table, a video lottery terminal operable to additionally display one or more table games being played at a gaming table, a video keno machine operable to additionally display one or more table games being played at a gaming table, a video bingo machine located on a casino floor operable to additionally display one or more table games being played at a gaming table, or a sports betting terminal operable to additionally display one or more table games being played at a gaming table), any suitable augmented reality device (wherein the data associated with the one or more games being played at a gaming table are accessed over a network), any suitable virtual reality device (wherein the data associated with the one or more games being played at a gaming table are accessed over a network), any suitable mixed reality device (wherein the data associated with the one or more games being played at a gaming table are accessed over a network), and/or any suitable personal gaming device (wherein the data associated with the one or more games being played at a gaming table are accessed over a network). Accordingly, in different embodiments, the system of the present disclosure includes various components and/or sub-systems that operate individually and/or collectively to enable certain aspects of a play of a game occurring at a gaming table to be captured, zero, one or more of these captured aspects to be modified and certain modified and/or unmodified aspects of the play of the game occurring at the gaming table to be streamed to one or more gaming terminals.

In operation of certain embodiments, the system monitors for an occurrence of a capture event (i.e., a dealing of playing cards for a play of a game occurring at a gaming table) that potentially results in the capturing of content and/or modification of captured content displayed by one or more gaming terminals associated with the game being played at the gaming table. In such embodiments, responsive to an occurrence of a capture event, the system captures data associated with the game being played at the gaming table including, but not limited to, audio/visual content associated with physical game elements (e.g., playing cards, wagering chips) displayed (or supported) by the gaming table, and/or audio-visual content associated with the dealer of the gaming table. In certain embodiments, the system captures one or more images (and/or video) of each dealt playing card for each gaming terminal associated with the play of the game occurring at the gaming table. In certain embodiments, the system captures one or more images (and/or video) of each dealt playing card for certain gaming terminals associated with the play of the game occurring at the gaming table but not other gaming terminals associated with the play of the game occurring at the gaming table. In certain embodiments, the system captures one or more images (and/or video) of certain, but not all, of the dealt playing cards for one or more gaming terminals associated with the play of the game occurring at the gaming table.

In certain embodiments, the data additionally or alternatively comprises data associated with the gaming session occurring at the gaming table, such as, but not limited to, amounts wagered at the gaming table, amounts won at the gaming table, configuration data (e.g., manufacturer, denomination, paytable data), bonusing data (e.g., progressive win, system bonus win), and/or funding data associated with the gaming table.

In certain embodiments, following the capture of one or more images of one or more dealt playing cards from the gaming table, the system determines whether a playing card modification event has occurred. That is, after obtaining the data associated with the content generated at the gaming table and prior to enabling any remote viewers access to that particular captured data, the system determines whether to one or more events have occurred to augment such content by changing part of the content, removing part of the content and/or adding to the content.

In certain embodiments, a playing card modification event occurs if the system determines that one or more dealt playing cards qualify as one or more designated playing cards. In these embodiments, one or more playing cards in one or more decks of playing cards dealt at a gaming table qualify as designated playing cards that the system captures images and/or videos of and then uses part, all or none of such captured images and/or videos to create one or more alternative playing cards displayed at one or more gaming terminals associated with the gaming table. For example, a shoe of five decks of playing cards includes twenty playing cards that qualify as designated playing cards. In this example, if any of the twenty playing cards that qualify as a designated playing card are dealt at the gaming table, the system enables one or more images and/or videos of that designated playing card to be modified prior to the images and/or videos being displayed to one or more remote players at one or more gaming terminals.

In certain embodiments, the system employs one or more blank playing cards as designated playing cards. In these embodiments, the dealing of a blank playing card results in an occurrence of a playing card modification event. In one such embodiment, the deck of playing cards used at the gaming table includes one or more blank playing cards intermixed with the non-blank playing cards (i.e., playing cards that display a rank and suit). In this embodiment, a blank playing card is dealt by the dealer if such a blank playing card is the next card in the shoe. In another such embodiment, a deck of blank playing cards is used at the gaming table and a deck of non-blank playing cards is used at the gaming table. In this embodiment, the system notifies the dealer from which deck of playing cards the next playing card should be dealt from. In another such embodiment, the deck of playing cards at the gaming table includes non-blank playing cards and the system employs a virtual shoe of blank playing cards. In this embodiment, following the dealing of non-blank playing cards at the gaming table, the system determines whether or not to deal a blank playing card (from the virtual shoe) to be used as part of the playing cards displayed by the gaming terminals remote from the gaming table.

In certain embodiments, the system employs one or more designated playing cards that include multiple suits. In these embodiments, the dealing of such a designated playing card results in an occurrence of a playing card modification event. For example, the dealing of a playing card having the suit of hearts and the suit of spades causes the occurrence of a playing card modification event as the system needs to determine which suit, if any, to employ for the play of the game being displayed at the gaming terminals. In one such embodiment, the deck of playing cards used at the gaming table includes one or more designated playing cards having multiple suits intermixed with the non-designated playing cards (i.e., playing cards that display a single rank and a single suit). In this embodiment, a designated playing card is dealt by the dealer if such a designated playing card is the next card in the shoe. In another such embodiment, a deck of designated playing cards including multiple suits is used at the gaming table and a deck of non-designated playing cards is used at the gaming table. In this embodiment, the system notifies the dealer from which deck of playing cards the next playing card should be dealt from. In another such embodiment, the deck of playing cards at the gaming table includes non-designated playing cards and the system employs a virtual shoe of designated playing cards including multiple suits. In this embodiment, following the dealing of non-designated playing cards at the gaming table, the system determines whether or not to deal a designated playing card (from the virtual shoe) to be used as part of the playing cards displayed by the gaming terminals remote from the gaming table.

In certain embodiments, the system employs one or more designated playing cards that include multiple ranks. In these embodiments, the dealing of such a designated playing card results in an occurrence of a playing card modification event. For example, the dealing of a playing card having the rank of seven and the rank of four causes the occurrence of a playing card modification event as the system needs to determine which rank, if any, to employ for the play of the game being displayed at the gaming terminals. In one such embodiment, the deck of playing cards used at the gaming table includes one or more designated playing cards having multiple ranks intermixed with the non-designated playing cards (i.e., playing cards that display a single rank and a single rank). In this embodiment, a designated playing card is dealt by the dealer if such a designated playing card is the next card in the shoe. In another such embodiment, a deck of designated playing cards including multiple ranks is used at the gaming table and a deck of non-designated playing cards is used at the gaming table. In this embodiment, the system notifies the dealer from which deck of playing cards the next playing card should be dealt from. In another such embodiment, the deck of playing cards at the gaming table includes non-designated playing cards and the system employs a virtual shoe of designated playing cards including multiple ranks. In this embodiment, following the dealing of non-designated playing cards at the gaming table, the system determines whether or not to deal a designated playing card (from the virtual shoe) to be used as part of the playing cards displayed by the gaming terminals remote from the gaming table.

In certain embodiments, the system employs one or more designated playing cards that include multiple suits and multiple ranks. In these embodiments, the dealing of such a designated playing card results in an occurrence of a playing card modification event. For example, the dealing of a playing card having the rank of seven and the rank of four and the suit of spades and the suit of diamonds causes the occurrence of a playing card modification event as the system needs to determine which rank, if any, and which suit, if any, to employ for the play of the game being displayed at the gaming terminals. In one such embodiment, the deck of playing cards used at the gaming table includes one or more designated playing cards having multiple suits and multiple ranks intermixed with the non-designated playing cards (i.e., playing cards that display a single rank and a single rank). In this embodiment, a designated playing card is dealt by the dealer if such a designated playing card is the next card in the shoe. In another such embodiment, a deck of designated playing cards including multiple suits and multiple ranks is used at the gaming table and a deck of non-designated playing cards is used at the gaming table. In this embodiment, the system notifies the dealer from which deck of playing cards the next playing card should be dealt from. In another such embodiment, the deck of playing cards at the gaming table includes non-designated playing cards and the system employs a virtual shoe of designated playing cards including multiple suits and multiple ranks. In this embodiment, following the dealing of non-designated playing cards at the gaming table, the system determines whether or not to deal a designated playing card (from the virtual shoe) to be used as part of the playing cards displayed by the gaming terminals remote from the gaming table.

In certain embodiments, the system employs one or more designated playing cards that include a machine-readable code, such as a barcode or a QR code, with or without including any rank and/or suit. In these embodiments, the dealing of such a designated playing card results in an occurrence of a playing card modification event and a modification of that playing card. In certain embodiments, the modification of that playing card and/or the activation of a feature associated with that playing card is encoded in the machine-readable code that is read by the system following the playing card being dealt. In certain embodiments, the machine-readable code being dealt results in the system determining a modification not otherwise encoded in the machine-readable code. In one embodiment, the deck of playing cards used at the gaming table includes one or more designated playing cards intermixed with the non-designated playing cards (i.e., playing cards that display a rank and suit without any machine-readable code). In this embodiment, a designated playing card is dealt by the dealer if such a designated playing card is the next card in the shoe. In another such embodiment, a deck of designated playing cards is used at the gaming table and a deck of non-designated playing cards is used at the gaming table. In this embodiment, the system notifies the dealer from which deck of playing cards the next playing card should be dealt from. In another such embodiment, the deck of playing cards at the gaming table includes non-designated playing cards and the system employs a virtual shoe of designated playing cards. In this embodiment, following the dealing of non-designated playing cards at the gaming table, the system determines whether or not to deal a designated playing card (from the virtual shoe) to be used as part of the playing cards displayed by the gaming terminals remote from the gaming table.

In certain embodiments, the determination of whether or not a playing card modification event occurs is independent of the employment of any particular type of card, such as independent of the use of any blank playing card, any designated playing cards including multiple suits, any designated playing cards including multiple ranks, any designated playing cards including multiple suits and multiple ranks and/or any designated playing cards employing any machine-readable codes. In these embodiments, the system may modify any playing card (i.e., a playing card with a rank and suit displayed at a gaming table is displayed as a different playing card by a gaming terminal remote from the gaming table) such that a playing card modification event may or may not occur in association with any play of any game occurring at the gaming table. In certain such embodiments, a playing card modification event occurs based on a displayed event occurring at the gaming table and/or at a gaming terminal associated with the gaming table. In certain other embodiments, a playing card modification event occurs independent of any displayed event occurring at the gaming table and/or any gaming terminal associated with the gaming table.

If the system determines that no playing card modification event occurs, the system proceeds with causing one or more gaming terminals to display images and/or video of the playing cards at the gaming table as if the player at the gaming terminal were at the gaming table. That is, if no determination occurs to modify any of the playing cards dealt at the gaming table, the system proceeds with streaming images and/or video of such playing cards to the remotely located gaming terminals without otherwise modifying the form or function of the dealt playing cards.

On the other hand, if the system determines that a playing card modification event occurred, the system modifies part or all of the data captured from the gaming table. In other words, upon an occurrence of a modification event and prior to enabling any remote viewers access to that particular captured data, the system modifies or otherwise alters the data captured from the gaming table to supplement the captured images and/or video with additional content and/or alternative content. In various embodiments, the additional content and/or alternative content is added to one or more images of one or more playing cards by overlaying the additional content and/or alternative content onto a captured frame of a display device of the gaming terminal displaying the playing cards and/or separately displaying the additional content and/or alternative content along with a captured frame of a display device of the gaming terminal displaying the playing cards such that the display by the gaming terminal includes audio-visual content of the user's gaming session as well as the additional content and/or alternative content.

Figure 2:
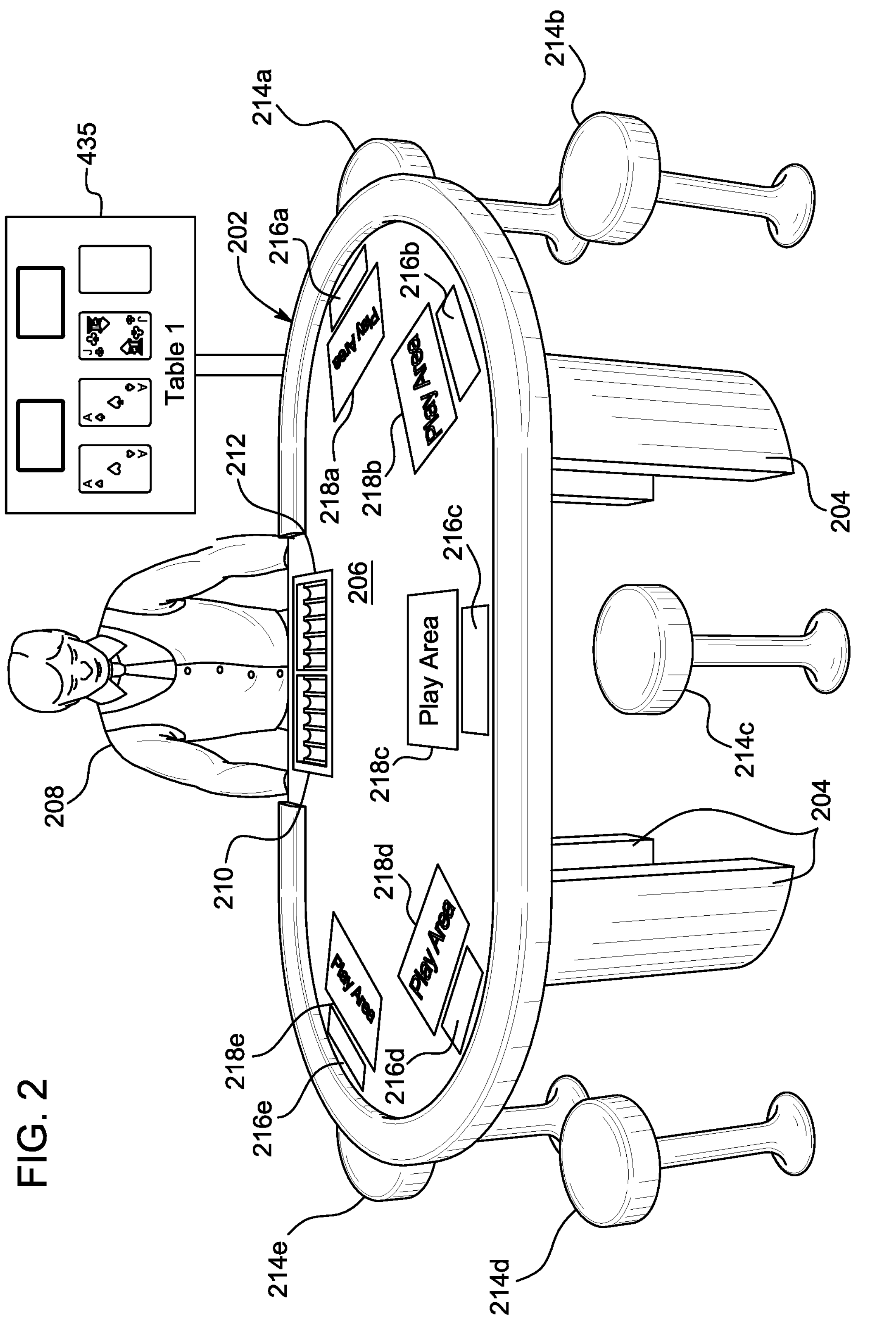
FIG. 2 is a perspective view of one embodiment of a gaming table of the present disclosure.
Figure 3:
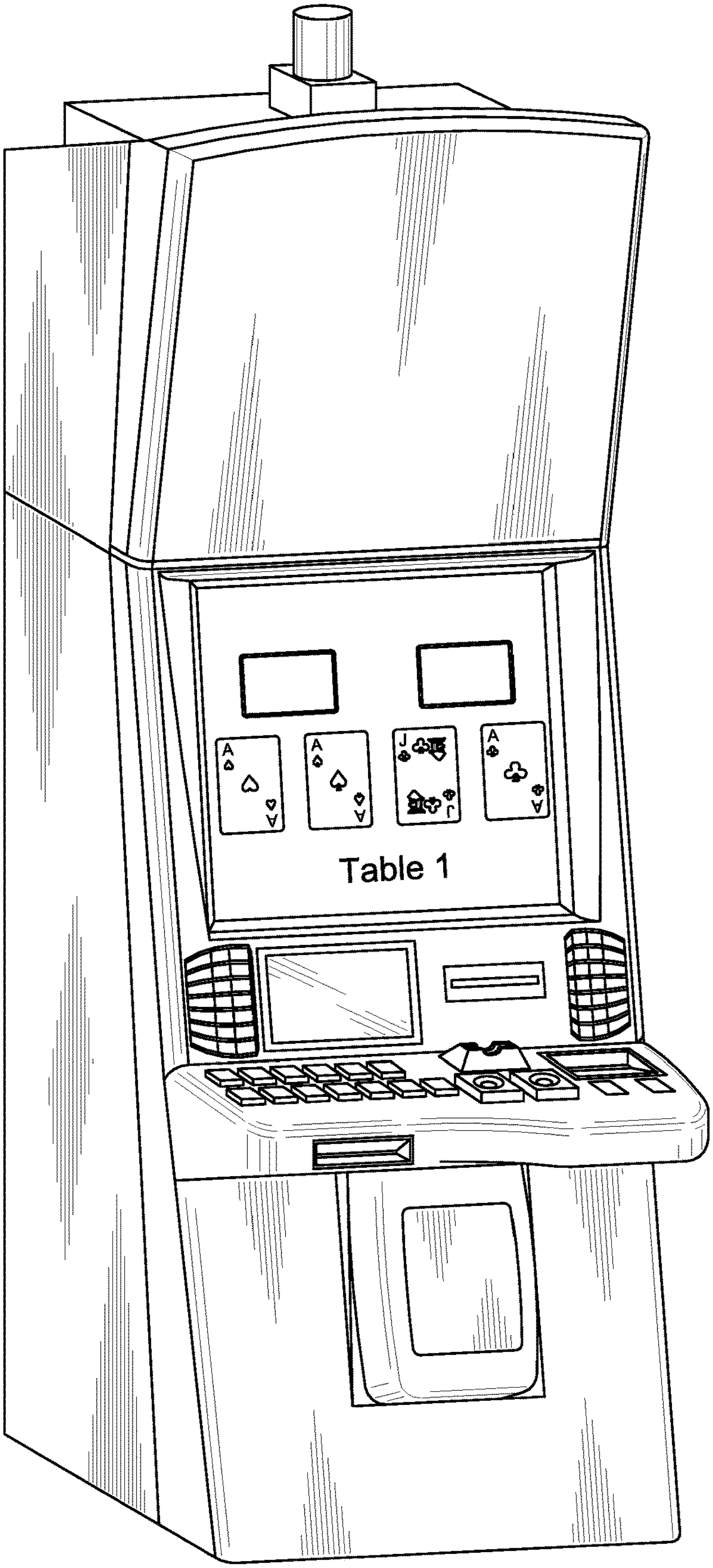
FIG. 3 is a front view of one embodiment of a gaming terminal associated with the gaming table of FIG. 2.

In certain embodiments, the modification includes determining content to display as associated with a dealt blank playing card. In one such embodiment, the modification includes determining a rank to display in association with a dealt blank playing card. For example, for a dealt blank playing card having a suit of diamonds without any rank, the system determines a rank of queen such that that playing card is displayed to one or more players at one or more gaming terminals as a queen of diamonds playing card. In another such embodiment, the modification includes determining a suit to display in association with a dealt blank playing card. For example, for a dealt blank playing card having a rank of seven without any suit, the system determines a suit of spades such that that playing card is displayed to one or more players at one or more gaming terminals as a seven of spades playing card. In another such embodiment, the modification includes determining a rank and a suit to display in association with a dealt blank playing card. For example, as seen in FIG. 2, following a blank playing card not having any suit or any rank being dealt at the gaming table, the system determines a rank of ace and a suit of clubs such that, as seen at the gaming terminal of FIG. 3, the blank playing card at the gaming table is displayed as an ace of clubs playing card.

In another such embodiment, the modification includes determining a modifier, such as a multiplier, to display in association with a dealt blank playing card. For example, for a dealt blank playing card without any rank or any suit, the system determines a 3× multiplier to display in association with that playing card. Such a modifier results in a modification of any award resulting from the play of the game displayed at the gaming terminal. In another such embodiment, the modification includes determining an award amount, such as a monetary award amount (e.g., an amount of monetary currency or an amount of cryptocurrency) or a non-monetary award amount (e.g., a quantity of promotional credits or a quantity of player tracking points) to display in association with a dealt blank playing card. In another such embodiment, the modification includes determining a bonus event to display in association with a dealt blank playing card. In another such embodiment, the modification includes determining a feature to activate based on the dealt blank playing card and in association with one or more plays of one or more games being displayed at the gaming terminal. In another such embodiment, the modification includes determining an achievement to display in association with a dealt blank playing card. In another such embodiment, the modification includes determining a good and/or service to display in association with a dealt blank playing card.

It should be appreciated that in different embodiments, the system may modify the blank playing card to display any content that may affect the play of the table game being displayed by the gaming terminal and/or any content that may be independent of the play of the table game being displayed by the gaming terminal. It should be further appreciated that in certain embodiments in which a dealt blank playing card is modified to include certain attributes beyond a rank and suit (i.e., a dealt blank playing card is modified such that the dealt blank playing card, after being modified, cannot be used to form any combination of playing cards with the other dealt playing cards), the system employs one or more additional playing cards (generated by the system or dealt by the dealer at the gaming table) that may be used to form one or more combinations with one or more other playing cards dealt.

In certain embodiments, the modification includes determining content to display as associated with a dealt playing card including a machine-readable code. In one such embodiment, the modification includes determining a rank to display in association with a dealt playing card including a machine-readable code. For example, for a dealt playing card having a suit of spades and a machine-readable code (instead of any rank), the system determines a rank of four such that that playing card is displayed to one or more players at one or more gaming terminals as a four of spades playing card. In another such embodiment, the modification includes determining a suit to display in association with a dealt playing card including a machine-readable code. For example, for a dealt playing card having a rank of king and a machine-readable code (instead of any suit), the system determines a suit of clubs such that that playing card is displayed to one or more players at one or more gaming terminals as a king of clubs playing card. In another such embodiment, the modification includes determining a rank and a suit to display in association with a dealt playing card including a machine-readable code. For example, for a dealt playing card having a machine-readable code (instead of any rank or any suit), the system determines a rank of two and a suit of hearts such that that playing card is displayed to one or more players at one or more gaming terminals as a two of hearts playing card.

In another such embodiment, the modification includes determining a modifier, such as a multiplier, to display in association with a dealt playing card including a machine-readable code. In another such embodiment, the modification includes determining an award amount, such as a monetary award amount (e.g., an amount of monetary currency or an amount of cryptocurrency) or a non-monetary award amount (e.g., a quantity of promotional credits or a quantity of player tracking points) to display in association with a dealt playing card including a machine-readable code. In another such embodiment, the modification includes determining a bonus event to display in association with a dealt playing card including a machine-readable code. In another such embodiment, the modification includes determining a feature to activate based on the dealt playing card including a machine-readable code and in association with one or more plays of one or more games being displayed at the gaming terminal. In another such embodiment, the modification includes determining an achievement to display in association with a dealt playing card including a machine-readable code. In another such embodiment, the modification includes determining a good and/or service to display in association with a dealt playing card including a machine-readable code.

It should be appreciated that in different embodiments, the system may modify the playing card including a machine-readable code to display any content that may affect the play of the table game being displayed by the gaming terminal and/or any content that may be independent of the play of the table game being displayed by the gaming terminal. It should be further appreciated that in certain embodiments in which a dealt playing card having a machine-readable code is modified to include certain attributes beyond a rank and suit (i.e., a dealt playing card with a machine-readable code and without any rank or suit is modified such that the dealt playing card cannot be used to form any combination of playing cards with the other dealt playing cards), the system employs one or more additional playing cards (generated by the system or dealt by the dealer at the gaming table) that may be used to form one or more combinations with one or more other playing cards dealt.

In certain embodiments, the modification includes determining content to display as associated with a dealt multiple suit and multiple rank playing card. In one embodiment, the modification includes randomly determining a rank (of the multiple ranks) and a suit (of the multiple suits) to display in association with that dealt multiple suit and multiple rank playing card. For example, a player is playing blackjack and is dealt playing cards having ranks of ten and six. In this example, the player hits and is dealt a designated playing card having both rank and suit combinations of a two of spades and a six of hearts. The player stands and after the dealer's hand is settled, the system randomly determines to employ the designated playing cards as a six of hearts (and not a two of spades) resulting in the player's hand busting. In another embodiment, the modification includes determining a rank (of the multiple ranks) and a suit (of the multiple suits) to display in association with that dealt multiple suit and multiple rank playing card based on one or more factors, such as an identity of the player, an amount of the wager placed, and/or maximizing the award for the player. In one embodiment, the system causes the gaming terminal to display the multiple suit and multiple rank playing card as dealt at the gaming table and the modification includes determining a suit and a rank to use for the play of the game displayed at the gaming terminal. In another embodiment, in addition to (or alternative from) selecting a rank and suit to display to display with the multiple suit and multiple rank playing card, the system determines zero, one or more of the modifications applicable to the playing card to display in association with the multiple suit and multiple rank playing card.

In certain embodiments, the modification includes determining content to display as associated with a dealt multiple suit playing card. In one embodiment, the modification includes randomly determining a suit (of the multiple suits) to display in association with that dealt multiple suit playing card. In another embodiment, the modification includes determining a suit (of the multiple suits) to display in association with that dealt multiple suit playing card based on one or more factors, such as an identity of the player, an amount of the wager placed, and/or maximizing the award for the player. In one embodiment, the system causes the gaming terminal to display the multiple suit playing card as dealt at the gaming table and the modification includes determining a suit to use for the play of the game displayed at the gaming terminal. In another embodiment, in addition to (or alternative from) selecting a suit to display to display with the multiple suit playing card, the system determines zero, one or more of the modifications applicable to the playing card to display in association with the multiple suit playing card.

In certain embodiments, the modification includes determining content to display as associated with a dealt multiple rank playing card. In one embodiment, the modification includes randomly determining a rank (of the multiple ranks) to display in association with that dealt multiple rank playing card. In another embodiment, the modification includes determining a rank (of the multiple rank) to display in association with that dealt multiple rank playing card based on one or more factors, such as an identity of the player, an amount of the wager placed, and/or maximizing the award for the player. In one embodiment, the system causes the gaming terminal to display the multiple rank playing card as dealt at the gaming table and the modification includes determining a rank to use for the play of the game displayed at the gaming terminal. In another embodiment, in addition to (or alternative from) selecting a rank to display to display with the multiple rank playing card, the system determines zero, one or more of the modifications applicable to the playing card to display in association with the multiple rank playing card.

In certain embodiments, the modification includes determining content to display instead of the content otherwise displayed by the dealt playing card. In these embodiments, the playing cards dealt at the gaming table includes a rank and a suit and the system determines content to be displayed instead of all (or part) of the rank and suit of the dealt playing card.

In certain embodiments, the modification includes determining a different rank to display in association with a dealt playing card. In another embodiment, the modification includes determining a different suit to display in association with a dealt playing card. In another embodiment, the modification includes determining a different rank and a different suit to display in association with a dealt playing card. For example, while a dealer at a gaming table displays a two of spades playing cards, the system alters the display of that playing card at one or more gaming terminals to display an ace of hearts playing cards.

In another embodiment, the modification includes determining a modifier, such as a multiplier, to alternatively display in association with a dealt playing card. In another embodiment, the modification includes determining an award amount, such as a monetary award amount (e.g., an amount of monetary currency or an amount of cryptocurrency) or a non-monetary award amount (e.g., a quantity of promotional credits or a quantity of player tracking points) to alternatively display in association with a dealt playing card. In another such embodiment, the modification includes determining a bonus event to alternatively display in association with a dealt playing card. In another such embodiment, the modification includes determining a feature to alternatively activate based on the dealt playing card and in association with one or more plays of one or more games being displayed at the gaming terminal. In another such embodiment, the modification includes determining an achievement to alternatively display in association with a dealt playing card. In another such embodiment, the modification includes determining a good and/or service to alternatively display in association with a dealt playing card.

It should be appreciated that in different embodiments, the system may modify the playing card to alternatively display any content that may affect the play of the table game being displayed by the gaming terminal and/or any content that may be independent of the play of the table game being displayed by the gaming terminal. It should be further appreciated that in certain embodiments in which a dealt playing card is modified to include certain attributes beyond a rank and suit (i.e., a dealt playing card is modified such that the dealt playing card cannot be used to form any combination of playing cards with the other dealt playing cards), the system employs one or more additional playing cards (generated by the system or dealt by the dealer at the gaming table) that may be used to form one or more combinations with one or more other playing cards dealt. For example, the system provides an overlay for a player at a gaming terminal to see a "$2.00 bonus" playing card which awards the player an additional $2.00 if they win the hand. In this example, following the display of this overlay, the system prompts the dealer to deal another playing card.

In certain embodiments, the modification includes determining supplemental content to additionally display with the content displayed by the dealt playing card. In these embodiments, the playing cards dealt at the gaming table includes a rank and a suit and the system determines supplemental content to be additionally displayed with the rank and suit of the dealt playing card. In one such embodiment, the modification includes determining an additional rank to display in association with a dealt playing card. In another such embodiment, the modification includes determining an additional suit to display in association with a dealt playing card. In another such embodiment, the modification includes determining an additional rank and an additional suit to display in association with a dealt playing card. In another such embodiment, the modification includes determining a modifier, such as a multiplier, to additionally display in association with a dealt playing card. In another such embodiment, the modification includes determining an award amount, such as a monetary award amount (e.g., an amount of monetary currency or an amount of cryptocurrency) or a non-monetary award amount (e.g., a quantity of promotional credits or a quantity of player tracking points) to additionally display in association with a dealt playing card. In another such embodiment, the modification includes determining a bonus event to additionally display in association with a dealt playing card. In another such embodiment, the modification includes determining a feature to activate based on the dealt playing card and in association with one or more plays of one or more games being displayed at the gaming terminal. In another such embodiment, the modification includes determining an achievement to additionally display in association with a dealt playing card. In another such embodiment, the modification includes determining a good and/or service to additionally display in association with a dealt playing card. It should be appreciated that in these embodiments, the system may modify the playing card to additionally display any content that may affect the play of the table game being displayed by the gaming terminal and/or any content that may be independent of the play of the table game being displayed by the gaming terminal.

In certain embodiments, if the system determines that a modification event occurs in association with how one or more playing cards dealt at a gaming table are displayed at one or more gaming terminals, the system determines one or more parameters of the modification. In certain embodiments, the parameters of the modification is based on one or more displayed events or elements (or the lack of one or more displayed events or elements) at the gaming table and/or at one or more gaming terminals. For example, the system determines a rank and suit of a blank playing card (i.e., the parameters of the modification of the blank playing card) based on the rank and suit of another playing card dealt at the gaming table (i.e., other displayed elements at the gaming table). In certain embodiments, the parameters of the modification is independent of any displayed events or elements (and independent of the lack of any displayed events or elements) at the gaming table and/or one or more gaming terminals. For example, the system randomly determines a rank of a rankless playing card (i.e., a parameter of the modification of that playing card).

In certain embodiments, the parameters of the modification is based on one or more other playing cards dealt at the gaming table. In certain embodiments, the parameters of the modification is based on if a designated playing card is part of a winning hand of playing cards. In certain embodiments, the parameters of the modification is based on if a designated playing card is part of a losing hand of playing cards. In certain embodiments, the parameters of the modification is based on if a designated playing card is part of a near-miss hand of playing cards (e.g., four playing cards to a royal flush hand of playing cards). In certain embodiments, the parameters of the modification is based on the position of the gaming table where a playing card is dealt. In certain embodiments, the parameters of the modification is based on the order which playing cards are dealt at the gaming table. In certain embodiments, the parameters of the modification is based on one or more conditions of the game being played at the gaming table being satisfied (or not being satisfied). For example, the system determines a rank and suit of a blank playing card based on a player at the gaming table (and/or a player at a gaming terminal) taking one or more player actions (or not taking such actions) and thus satisfying (or not satisfying) a condition associated with these player actions.

In certain embodiments, the parameters of the modification is based on the game being played at the gaming table. In these embodiments, different games being played at the gaming table are associated with different modifications to the same designated playing card dealt. In certain embodiments, the parameters of the modification is based on a progress of the game being played at the gaming table. In these embodiments, different points of a game being played at the gaming table are associated with different modifications to the same designated playing card dealt. For example, the system accounts for a playing card being the first card dealt or a last card dealt in determining one or more modifications to one or more playing cards. In certain embodiments, the parameters of the modification is based on the applicability of the modification to one or more gaming terminals. In these embodiments, the same playing card being modified for one game displayed at one gaming terminal or being modified for a plurality of games displayed at a plurality of gaming terminals results in different modifications to the same designated playing card dealt.

In certain embodiments, the parameters of the modification is based on an identity of one or more players at the gaming table. In certain embodiments, the parameters of the modification is based on if one or more players at the gaming table are enrolled in a player tracking program (or have a player tracking account status greater than a threshold status). In certain embodiments, the parameters of the modification is based on if one or more players at the gaming table are associated with one or more gaming establishment accounts (e.g., cashless wagering accounts and/or gaming establishment retail accounts) or have transacted against such accounts for at least a threshold amount or quantity of transactions. In certain embodiments, the parameters of the modification is based on an identity of one or more players at one or more gaming terminals. In certain embodiments, the parameters of the modification is based on if one or more players at one or more gaming terminals are enrolled in a player tracking program (or have a player tracking account status greater than a threshold status). In certain embodiments, the parameters of the modification is based on if one or more players at one or more gaming terminals are associated with one or more gaming establishment accounts (e.g., cashless wagering accounts and/or gaming establishment retail accounts) or have transacted against such accounts for at least a threshold amount or quantity of transactions.

In certain embodiments, as mentioned above, the modification includes determining a bonus event to additionally display in association with a playing card dealt at the gaming table. In these embodiments, the bonus event includes one or more free (or reduced cost) plays of one or more games of chance (or games of skill). In these embodiments, such games of chance (or games of skill) include, but are not limited to: a play of any suitable slot game; a play of any suitable wheel game; a play of any suitable additional card game (beyond the card game being played at the gaming table), a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window of a gaming terminal; a play of any suitable game on a mobile device; and/or a play of any suitable game of the present disclosure.

In certain embodiment, as mentioned above, the modification includes determining a feature to activate in association with one or more plays of one or more games being displayed at the gaming terminal. In certain embodiments, the features to activate and/or the magnitude of such features is based on one or more of the above-described factors for determining the modification of the playing card dealt at the gaming table. In certain embodiments, the system selects the same feature for each modification with the magnitude of the feature changing from playing card to playing card. In certain embodiments, the system selects different features for two or more playing cards. In certain embodiments, different features have the same probability of being selected. In certain embodiments, different features have different probabilities of being selected.

In different embodiments, the features activated for one or more playing cards include any feature that results in a modification of one or more components, aspects, or elements of one or more plays of a game, such as the modification of one or more game outcomes of one or more plays of a game, the modification of the paytable utilized for one or more plays of the game and/or the modification of any award determined for one or more plays of the game. In such different embodiments, the features include, but are not limited to: a feature modifying a placed wager amount; a feature modifying a placed side wager amount; a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying an amount of free spins provided; a feature modifying a game terminating or ending secondary event condition; a feature modifying how one or more aspects of one or more games (e.g., colors, speeds, sound) are displayed; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature which superimposed one or more symbols over any randomly generated symbols of any reels; a feature which replaces one or more symbols of any randomly generated symbols of any reels with a predetermined symbol pattern; a feature which replaces one or more symbols of any randomly generated symbols of any reels with a predetermined pattern of wild symbols; a book-end wild symbols feature; a stacked wild symbols feature; an expanding wild symbols feature; a nudging wild symbols feature; a feature modifying a quantity of wild symbols available to be generated; a retrigger symbol feature; an anti-terminator symbol feature; a locking reel feature; an expanding reel feature; a locking symbol position feature; and/or a feature modifying any game play feature associated with any play of any game of the present disclosure.

In certain embodiments, the determination of the modification to employ for one or more playing cards occurs before the play of the game begins at the gaming table. For example, the system informs one or more players at one or more gaming terminals associated with the gaming table that designated playing cards will award a 2× multiplier in the next hand dealt of blackjack. In this example, if any designated playing cards are dealt, the system modifies one or more awards by the 2× multiplier.

In certain embodiments, the determination of the modification to employ for one or more playing cards occurs after the play of the game begins at the gaming table but before any players have seen any playing cards. For example, after players have placed bets (at the gaming table and/or at the gaming terminals associated with the gaming table) on the play of the game occurring at the gaming table, the system informs one or more players at one or more gaming terminals associated with the gaming table that designated playing cards will trigger a $5 payout if included in any winning hand. In this example, if any designated playing cards are dealt and form part of any winning hands, the system modifies one or more awards by adding $5.

In certain embodiments, prior to the play of the game at the gaming table and/or after the play of the game at the gaming table has begun but prior to any playing cards being dealt, the system determines a modification for any designated playing cards dealt and applies that modification to each of any designated playing cards dealt. In certain embodiments, prior to the play of the game at the gaming table and/or after the play of the game at the gaming table has begun but prior to any playing cards being dealt, the system determines a modification for any designated playing cards dealt and applies that modification to the first designated playing card dealt. In certain embodiments, prior to the play of the game at the gaming table and/or after the play of the game at the gaming table has begun but prior to any playing cards being dealt, the system determines a series of modifications for any designated playing cards dealt and sequentially applies the series of modifications to any series of designated playing cards dealt.

In certain embodiments, the system applies the same modification for each gaming terminal associated with the game being played at the gaming table. In certain embodiments, the system applies different modifications for different gaming terminals associated with the game being played at the gaming table. In different embodiments, which modification is applied to which playing card displayed by which gaming terminal is based on one or more of an identity of the player at the respective gaming terminal, the amount of the wager placed at the respective gaming terminal, one or more inputs made (or not made) at the respective gaming terminal, and/or one or more random determinations made for one or more gaming terminals. For example, following a blank playing card being drawn at a gaming table, the system overlays onto the blank playing card content associated with a two of diamonds playing card displayed to a first player at a first gaming terminal and the system overlays onto the blank playing card content associated with a 2× multiplier displayed to a second player at a second gaming terminal.

Following the modification of part or all of one or more images and/or videos of one or more captured playing cards, the system proceeds with causing one or more gaming terminals to display zero, one or more unmodified images and/or unmodified video of the playing cards at the gaming table and one or more modified images and/or modified video of the playing cards at the gaming table (which is different from what is displayed at the gaming table). That is, if a determination occurs to modify one or more of the playing cards dealt at the gaming table, the system streams modified images and/or modified video of such playing cards to the remotely located gaming terminals with such modifications affecting the form or function of the dealt playing cards.

Following the display of one or more images and/or videos associated with the data captured from events occurring at a gaming table and/or associated with modified data captured from events occurring at the gaming table, the system determines and displays any awards associated with the content displayed at the gaming tables. In certain such embodiments in which any modification of a playing card resulted in a modification of any rank and/or any suit of a playing card dealt at the gaming table (or the generation of one or more ranks and/or suits of a playing card dealt without any legacy rank and/or suit at the gaming table, the system employs the system determined rank and/or suit in determining any award. In certain other embodiments in which any modification of a playing card resulted in another modification (with or without modifying any rank and/or any suit of a playing card dealt at the gaming table), the system determines an award based on the playing cards displayed by the gaming terminal and then employs the system determined modification, such as applying a system determined modifier to such an award or triggering a system determined supplemental game to determine an additional award.

In certain embodiments, the system employs one or more conditions in association with realizing the modification of the playing card. In these embodiments, while the system modifies how one or more playing cards dealt at a gaming table are displayed at one or more gaming terminals associated with the gaming table, the system additionally determines whether or not to utilize that modification based on the satisfaction of one or more conditions. In certain embodiments, the condition is based on how the hand of playing cards were resolved at the gaming terminal For example, if the system provides an overlay for a player at a gaming terminal to see a "$5.00 bonus" playing card displayed instead of a blank playing card dealt at a gaming table, the system determines if the player has the best hand of the hands being played at the gaming terminal (i.e., the satisfaction of a condition) or if the player lost the hand (i.e., the satisfaction of another condition) in determining whether or not the player realizes the $5.00 award.

Accordingly, the system of the present disclosure modifies one or more states of a game being played at a gaming table and streamed to one or more gaming terminals to personalize how different users at different gaming terminals interact with the system. Such an increased level of personalization offered via the modification of how certain physical elements are virtually displayed provides an improvement over prior systems and how they statically operated.

It should be appreciated that in different embodiments, one or more of: when a capture event occurs, what data is captured when a data capture event occurs, when a player card modification event, which playing cards are modified when a playing card modification event occurs, the modification made to one or more playing cards when a playing card modification event occurs, and/or any determination of the present disclosure is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming table component, determined independent of a random determination at the gaming table component, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

The above-described embodiments of the present disclosure may be implemented in accordance with or in conjunction with one or more of a variety of different types of gaming table components which operate with zero, one or more servers to cause zero, one or more events occurring (or not occurring) in one or more games being played at the gaming table to influence zero, one or more aspects of one or more games displayed at one or more gaming terminals.

Figure 4:
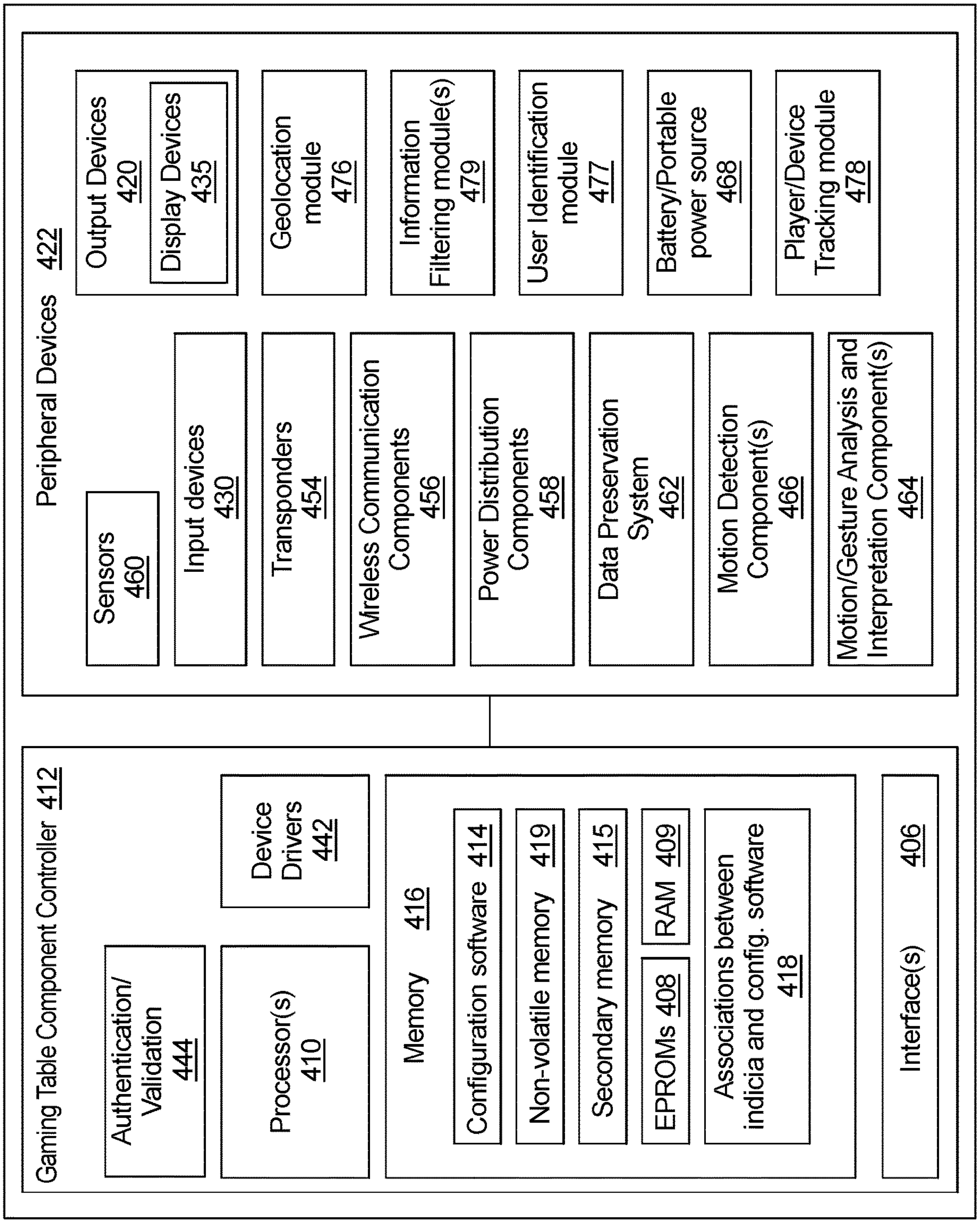
FIG. 4 is a schematic block diagram of one embodiment of a gaming table component of an example system disclosed herein.

In certain embodiments, as seen in FIG. 4, the gaming table component 400 includes a gaming table component controller 412 configured to communicate with and to operate with a plurality of peripheral devices 422.

The gaming table component controller 412 includes at least one processor 410. The at least one processor 410 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information) via a communication interface 406 of the gaming table component controller 412; (2) converting signals read by an interface to a format corresponding to that used by software or memory of the gaming table component; (3) accessing memory to configure or reconfigure parameters in the memory according to indicia read from the gaming table component; (4) communicating with interfaces and the peripheral devices 422 (such as input/output devices); and/or (5) controlling the peripheral devices 422. In certain embodiments, one or more components of the gaming table component controller 412 (such as the at least one processor 410) reside within a housing of the gaming table component (described below), while in other embodiments at least one component of the gaming table component controller 412 resides outside of the housing of the gaming table component.

The gaming table component controller 412 also includes at least one memory device 416, which includes: (1) volatile memory (e.g., RAM 409, which can include non-volatile RAM, magnetic RAM, ferroelectric RAM, and any other suitable forms); (2) non-volatile memory 419 (e.g., disk memory, FLASH memory, EPROMs, EEPROMs, memristor-based non-volatile solid-state memory, etc.); (3) unalterable memory (e.g., EPROMs 408); (4) read-only memory; and/or (5) a secondary memory storage device 415, such as a non-volatile memory device, configured to store gaming software related information (the software related information and the memory may be used to store various audio files not currently being used and invoked in a configuration or reconfiguration). Any other suitable magnetic, optical, and/or semiconductor memory may operate in conjunction with the gaming table component disclosed herein. In certain embodiments, the at least one memory device 416 resides within the housing of the gaming table component (described below), while in other embodiments at least one component of the at least one memory device 416 resides outside of the housing of the gaming table component.

The at least one memory device 416 is configured to store, for example: (1) configuration software 414, such as all the parameters and settings on the gaming table component; (2) associations 418 between configuration indicia read from a gaming table component with one or more parameters and settings; (3) communication protocols configured to enable the at least one processor 410 to communicate with the peripheral devices 422; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the gaming table component to communicate with local and non-local devices using such protocols. In one implementation, the gaming table component controller 412 communicates with other devices using a serial communication protocol. A few non-limiting examples of serial communication protocols that other devices, such as peripherals (e.g., a bill validator or a ticket printer), may use to communicate with the gaming table component controller 412 include USB, RS-242, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 416 is configured to store program code and instructions executable by the at least one processor of the gaming table component to control the gaming table component. The at least one memory device 416 of the gaming table component also stores other operating data, such as image data, event data, input data, or information, and/or applicable rules on the gaming table component. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in a gaming table component to implement at least part of the present disclosure. In other embodiments, part or all of the program code and/or the operating data is downloaded to the at least one memory device of the gaming table component through any suitable data network described above (such as an Internet or intranet).

The at least one memory device 416 also stores a plurality of device drivers 442. Examples of different types of device drivers include device drivers for gaming table component components and device drivers for the peripheral components 422. Typically, the device drivers 442 utilize various communication protocols that enable communication with a particular physical device. The device driver abstracts the hardware implementation of that device. For example, a device driver may be written for each type of card reader that could potentially be connected to the gaming table component. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the gaming table component loads the new device driver from the at least one memory device to enable communication with the new device. For instance, one type of card reader in the gaming table component can be replaced with a second different type of card reader when device drivers for both card readers are stored in the at least one memory device.

In certain embodiments, the software units stored in the at least one memory device 416 can be upgraded as needed. For instance, when the at least one memory device 416 is a hard drive, new parameters, new settings for existing parameters, new settings for new parameters, new device drivers, and new communication protocols can be uploaded to the at least one memory device 416 from the gaming table component controller 412 or from some other external device. As another example, when the at least one memory device 416 includes a CD/DVD drive including a CD/DVD configured to store options, parameters, and settings, the software stored in the at least one memory device 416 can be upgraded by replacing a first CD/DVD with a second CD/DVD. In yet another example, when the at least one memory device 416 uses flash memory 419 or EPROM 408 units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device 416 also stores authentication and/or validation components 444 configured to authenticate/validate specified gaming table component components and/or information, such as hardware components, software components, firmware components, peripheral device components, user input device components, information received from one or more user input devices, information stored in the at least one memory device 416, etc.

In certain embodiments, the peripheral devices 422 include several device interfaces, such as: (1) at least one output device 420 including at least one display device 435; (2) at least one input device 430 (which may include contact and/or non-contact interfaces); (3) at least one transponder 454; (4) at least one wireless communication component 456; (5) at least one wired/wireless power distribution component 458; (6) at least one sensor 460; (7) at least one data preservation component 462; (8) at least one motion/gesture analysis and interpretation component 464; (9) at least one motion detection component 466; (10) at least one portable power source 468; (11) at least one geolocation module 476; (12) at least one user identification module 477;

(13) at least one player/device tracking module 478; and (14) at least one information filtering module 479.

The at least one output device 420 includes at least one display device 435 configured to display any displayed by the gaming table component and any suitable information. In certain embodiments, the display devices are connected to or mounted on a housing of the gaming table component (described below).

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In certain embodiments, the at least one output device 420 is a sound generating device controlled by one or more sound cards. In one such embodiment, the sound generating device includes one or more speakers or other sound generating hardware and/or software configured to generate sounds.

The at least one input device 430 may include any suitable device that enables an input signal to be produced and received by the at least one processor 410 of the gaming table component.

In various embodiments, the at least one input device 430 includes a plurality of buttons that are programmable by the gaming table component operator to, when actuated, cause the gaming table component to perform particular functions. In certain embodiments, the at least one input device 430 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the gaming table component by touching the touch screen at the appropriate locations.

In embodiments including a player tracking system, as further described below, the at least one input device 430 includes a card reader in communication with the at least one processor of the gaming table component.

The at least one wireless communication component 456 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 456 transmits electrical, electromagnetic, or optical signals that carry digital data streams or analog signals representing various types of information.

The at least one wired/wireless power distribution component 458 includes components or devices that are configured to provide power to other devices. For example, in one embodiment, the at least one power distribution component 458 includes a magnetic induction system that is configured to provide wireless power to one or more user input devices near the gaming table component. In one embodiment, a user input device docking region is provided, and includes a power distribution component that is configured to recharge a user input device without requiring metal-to-metal contact. In one embodiment, the at least one power distribution component 458 is configured to distribute power to one or more internal components of the gaming table component, such as one or more rechargeable power sources (e.g., rechargeable batteries) located at the gaming table component.

In certain embodiments, the at least one sensor 460 includes at least one of: optical sensors, pressure sensors, RF sensors, infrared sensors, image sensors, thermal sensors, and biometric sensors. The at least one sensor 460 may be used for a variety of functions, such as: detecting movements and/or gestures of various objects within a predetermined proximity to the gaming table component; detecting the presence and/or identity of various persons (e.g., players, casino employees, etc.), devices (e.g., user input devices), and/or systems within a predetermined proximity to the gaming table component.

The at least one data preservation component 462 is configured to detect or sense one or more events and/or conditions that, for example, may result in damage to the gaming table component and/or that may result in loss of information associated with the gaming table component. Additionally, the data preservation system 462 may be operable to initiate one or more appropriate action(s) in response to the detection of such events/conditions.

The at least one motion/gesture analysis and interpretation component 464 is configured to analyze and/or interpret information relating to detected player movements and/or gestures to determine appropriate player input information relating to the detected player movements and/or gestures. For example, in one embodiment, the at least one motion/gesture analysis and interpretation component 464 is configured to perform one or more of the following functions: analyze the detected gross motion or gestures of a player; interpret the player's motion or gestures to identify instructions or input from the player. In other embodiments, at least a portion of these additional functions may be implemented at a remote system or device.

The at least one portable power source 468 enables the gaming table component to operate in a mobile environment. For example, in one embodiment, the gaming table component 400 includes one or more rechargeable batteries.

The at least one geolocation module 476 is configured to acquire geolocation information from one or more remote sources and use the acquired geolocation information to determine information relating to a relative and/or absolute position of the gaming table component. For example, in one implementation, the at least one geolocation module 476 is configured to receive GPS signal information for use in determining the position or location of the gaming table component. In another implementation, the at least one geolocation module 476 is configured to receive multiple wireless signals from multiple remote devices (e.g., gaming table components, servers, wireless access points, etc.) and use the signal information to compute position/location information relating to the position or location of the gaming table component.

The at least one user identification module 477 is configured to determine the identity of any current players at the gaming table associated with the gaming table component. For example, in one embodiment, the current players at the gaming table associated with the gaming table component are each required to perform a login process at the gaming table component in order to access one or more features.

Alternatively, the gaming table component is configured to automatically determine the identity of such players based on one or more external signals, such as an RFID tag that provides a wireless signal to the gaming table component that is used to determine the identity of the player. In at least one embodiment, various security features are incorporated into the gaming table component to prevent unauthorized users from accessing confidential or sensitive information.

The at least one information filtering module 479 is configured to perform filtering (e.g., based on specified criteria) of selected information to be displayed at one or more displays 435 of the gaming table component.

In various embodiments, the gaming table component includes a plurality of communication ports configured to enable the at least one processor of the gaming table component to communicate with and to operate with external peripherals, such as: accelerometers, arcade sticks, bar code readers, bill validators, biometric input devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

In various embodiments, in addition to or alternative from the gaming table component communicating to a gaming terminal data associated with the play of the table game occurring at the associated gaming table (such that the gaming terminal enables a player to participate in the play of the table game remote from the gaming table), the gaming table component includes or is associated with one or more servers configured to communicate with a personal gaming device (e.g., a smartphone, a tablet computer, a desktop computer, or a laptop computer), an augmented reality device, a virtual reality device and/or a mixed reality device to enable web-based game play using the personal gaming device, the augmented reality device, the virtual reality device and/or the mixed reality device. In various embodiments, the player must first access a gaming website via an Internet browser or execute an installed application (commonly called an "app") before the player can use the personal gaming device, the augmented reality device, the virtual reality device and/or the mixed reality device to participate in web-based game play. In certain embodiments, the one or more servers and the personal gaming device, the augmented reality device, the virtual reality device and/or the mixed reality device operate in a thin-client environment. In these embodiments, the personal gaming device, the augmented reality device, the virtual reality device and/or the mixed reality device receives inputs via one or more input devices (such as a touch screen and/or physical buttons), the personal gaming device, the augmented reality device, the virtual reality device and/or the mixed reality device sends the received inputs to the one or more servers, the one or more servers make various determinations based on the inputs and determine content to be displayed (such as a randomly determined game outcome and corresponding award), the one or more servers send the content to the personal gaming device, the augmented reality device, the virtual reality device and/or the mixed reality device, and the personal gaming device, the augmented reality device, the virtual reality device and/or the mixed reality device displays the content.

As described below in relation to a personal gaming device but applicable to employment with zero, one or more of an augmented reality device, a virtual reality device and/or a mixed reality device, in certain embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique playername and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming table component is configured to communicate with a personal gaming device—such as a smartphone, a tablet computer, a desktop computer, or a laptop computer—to enable tethered mobile game play using the personal gaming device. Generally, in these embodiments, the gaming table component establishes communication with the personal gaming device and enables the player to play games being played at a gaming table remotely via the personal gaming device. In certain embodiments, the gaming table component includes or is otherwise associated with a geo-fence system that enables tethered game play within a particular geographic area but not outside of that geographic area.

In certain embodiments, the gaming table component is configured to communicate with a social network server that hosts or partially hosts a social networking website via a data network (such as the Internet) to integrate a player's gaming experience with the player's social networking account. This enables the gaming table component to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming table component to receive certain information from the social network server, such as the player's likes or dislikes or the player's list of connections. In certain embodiments, the gaming table component enables the player to link the player's player account to the player's social networking account(s). This enables the gaming table component to, once it identifies the player and initiates a gaming session (such as via the player logging in to a website (or an application) on the player's personal gaming device or via the player inserting the player's player tracking card), link that gaming session to the player's social networking account(s). In other embodiments, the gaming table component enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming table component sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming table component sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming table component sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming table component enables the player to recommend a game to the player's connections by posting a recommendation to the player's wall (or other suitable area) of the social networking website.

In certain embodiments, as indicated above, the system employs one or more intelligent gaming tables or gaming chip tracking systems. In one embodiment, each intelligent gaming table enables one or more players to play one or more suitable games by placing one or more wagers utilizing such gaming chips. Such game play and/or wagering information is tracked by the intelligent gaming table and provided to a central server. In another embodiment, the central server is in communication with at least one player tracking system to identify at least one player currently placing at least one wager on at least one suitable game at at least one of the intelligent gaming tables in the system.

In another embodiment, the gaming tables utilized in the system are non-intelligent gaming tables wherein the gaming chip identification devices are not directly integrated or situated in or on the gaming tables. In this embodiment, one or more gaming chip identification devices are utilized to track each player's wagered gaming chips. In one such embodiment, gaming chip identification devices are located at, above or below the table. In another such embodiment, the gaming chip identification devices are attached to the gaming table or adjacent to the gaming table. In another such embodiment, the gaming chip identification devices are included in the gaming table. In these embodiments, gaming establishments do not have to purchase new gaming tables. Rather, gaming establishments may continue using the same gaming tables and install the intelligent table technology around one or more gaming tables.

In one embodiment, referring back to FIG. 2, a gaming table 202 includes a suitable support structure 204, such as one or more legs, a playing surface 206 and a dealer position 208. In one embodiment, the dealer position includes two different gaming chip trays 210 and 212 for holding several stacks of the dealer's gaming chips. The dealer may use the gaming chip trays to collect and store gaming chips, make change for a player, and/or distribute gaming chips upon a gaming chip distribution event associated with the gaming table component (not shown). The gaming table includes a plurality of player stations or seats 214*a*, 214*b*, 214*c*, 214*d* and 214*e*. In this example, there are five player stations or seats. It should be appreciated that the gaming table may accommodate any suitable number of player positions and players so as not to interfere with game play. In one embodiment, the gaming table includes a plurality of gaming chip holding areas 216*a*, 216*b*, 216*c*, 216*d* and 216*e* where the players hold their gaming chips. In certain embodiment, the gaming tables include wagering areas (not illustrated) where players place their bets. It should be appreciated that the gaming table may also include a community wagering area (not illustrated) where each of the players place their wagers. In one embodiment, the gaming table also includes a plurality of playing areas 218*a*, 218*b*, 218*c*, 218*d* and 218*e* associated with each of the player stations.

In one embodiment, cards are dealt by the dealer substantially within the respective playing areas, such that cards dealt to a first player position are not confused with cards dealt to a second different player position. It should be appreciated that games played at the gaming tables may include any suitable card game or any suitable non-card game, such as roulette and craps. The gaming tables are operable to include any suitable apparatuses or components of the games. It should be appreciated that different gaming tables in the system may include the same game components or different game components.

In one embodiment, one or more gaming tables in the system each include at least one processor and at least one memory device, including, but not limited to the processors and memory devices of the gaming table component described above. In one embodiment, the system of gaming tables is integrated with one or more player tracking systems. In this embodiment, the system and/or player tracking system is operable to track any participating player's gaming activity at each gaming table of the system. In one such embodiment, the system and/or the associated player tracking system timely tracks when a player inserts their playing tracking card to begin a gaming session and also timely tracks when a player removes their player tracking card, stops playing at the gaming table or cashes out when concluding play for that gaming session. In another embodiment, the dealer or host logs the player in and out. In one such embodiment, at the start of a gaming session, the player hands the player's tracking card to the dealer and the dealer or host logs the player in and out for a gaming session. In different embodiments, the system works in accordance with the player tracking system to maintain data about players.

In other embodiments, rather than requiring a player to insert a player tracking card or enter identifying information, the gaming table utilizes one or more portable devices carried by a player, such as a cell phone, email communication device, a radio frequency identification tag or any other suitable wireless device to track when a player begins and ends a gaming session. In other embodiments, the gaming table utilizes any suitable biometric technology or ticket technology to track when a player begins and ends a gaming session. Each of the gaming tables may include any suitable number of player tracking input devices, such as card readers or key pads to enter identification numbers. In one embodiment, each player station or seat includes an individual player tracking input device. In another embodiment, a gaming table includes a single player tracking input device. In another embodiment, only a dealer has access to the player tracking input device and inputs all of each player's information.

It should be appreciated that the intelligent table system disclosed herein may include any suitable components or devices to monitor the players' gaming activity. That is, the intelligent table systems tracks how much a player wagers or how many gaming chips a player wagers, how much a player has won or lost, how many gaming chips the player has on the gaming table, or any other desired tracking information. In one embodiment, the intelligent table system also tracks this information for each and every game played by the player. It should be appreciated that the intelligent table system may include any suitable gaming table areas with gaming chip identification devices, any suitable method of identifying the gaming chips, and may use any suitable gaming chip reading technology.

In one embodiment, the intelligent gaming tables or gaming chip tracking systems tracks, monitors and records game play occurring at one or more gaming table player stations, regardless of which player is currently playing at each gaming station. In another embodiment, the intelligent gaming tables or gaming chip tracking systems tracks, monitors and records game play of one or more players at such gaming tables. In this embodiment, the player tracking system identifies players and records or saves the game play information provided by the intelligent tables in specific player accounts.

In another embodiment, the intelligent gaming table disclosed herein employs a virtual gaming table. The virtual gaming table provide virtual playing cards and/or virtual gaming chips which enable one or more players to play one or more games at the intelligent gaming table. In one embodiment, such virtual gaming tables can utilize one or more surface computing mechanisms, one or more cameras and one or more of a plurality of display devices to provide these games. In one such embodiment, an intelligent gaming table includes an acrylic top and employs a plurality of infrared cameras and a DLP projector with wireless networks to display and detect objects and movement. In this embodiment, as players move their hands or objects on the table top, the cameras translate the motions into commands.

It should be appreciated that values may be assigned to gaming chips in any suitable manner. In one embodiment, different denominations of gaming chips are visually different, such as having the value displayed on the gaming chip, having different sizes and/or having different weights. In another such embodiment, each gaming chip is associated with one of a plurality of different values. In this embodiment, the intelligent table system identifies the individual gaming chips (such as using RFID technology described herein), determines the placement of each gaming chip and sends the information to the player tracking system or central controller about each of the specific gaming chips. In one embodiment, the central server associates the value of the gaming chip with the player tracking account.

In one embodiment, each of the gaming chips has or is associated with an identification number. The intelligent table system determines the gaming chip identification number upon play or win of a gaming chip or upon the evaluation of all of the gaming chips in a player's gaming chip identification area. The intelligent table system sends the gaming chip information to the central server. The system associates the gaming chip number with the amount and the player. For example, a first player's gaming chip identification area includes gaming chip number 876543 which is associated with the value of $1, gaming chip number 876545 which is associated with the value of $5 and gaming chip number 876547 which is associated with the value of $10. In one embodiment, the intelligent table system determines which gaming chips are in which identification area and sends the information to the central server. The system associates the gaming chip numbers with their value and uses the information to determine one or more aspects of game play.

The intelligent table system disclosed herein is operable to use a variety of types of technology to track player activity. More specifically, in one embodiment, the intelligent table system is operable to include one or more gaming chip identifying devices. In one embodiment, the intelligent table system uses Infra-red signals received from table game gaming chips to track activity. In another embodiment, as indicated above, the intelligent table system employs RFID to track gaming chip activity. The RFID is a system that uses a small electronic device that includes a small gaming chip and an antenna. The gaming chips are scanned at the gaming table to retrieve the identifying information. In another embodiment, the system uses optical technology. The system may use any suitable other gaming chip identification devices, which may use any suitable gaming chip identification technology, to determine player gaming table wagering activities. The gaming chips are tracked for total gaming chip movement or wins and losses. When each gaming chip is placed in a gaming chip identification area, such as a betting circle or in a player's betting or wagering area, gaming chip identification devices recognizes the gaming chip and relays this data to the intelligent table system.

The system disclosed herein contemplates a plurality of different methods that the gaming chips may be used and/or identified during game play. In one embodiment, a gaming chip identification area is a gaming chip holding area. In one embodiment, intelligent table system identifies all of the gaming chips in a player's gaming chip holding area. For example, during game play, a player is required to have all gaming chips in that player's possession in a gaming chip holding area which each include one or more gaming chip identification devices. Upon a game play checkpoint, such as at a designated time interval, upon a triggering event, at the end of a play of a game or at the end of a gaming session, the intelligent table system surveys each of the player's gaming chip holding areas to identify the players' gaming chips.

In one embodiment, the gaming chip identification area is a wagering area. In one embodiment, the system includes gaming chip identification devices in each player's wagering area. The system identifies either the specific gaming chips wagered and won or loss by that player or the number of gaming chips wagered and won or loss by the player. For example, a player logs into the player tracking system via a card slot at the player's player station at a gaming table. When a player places a gaming chip in the wagering area associated with that player station, the intelligent table system identifies that gaming chip. When a dealer or host provides a gaming chip to a player for a win, the intelligent table system identifies the gaming chip.

In another embodiment, both the gaming chip holding area and the wagering area include gaming chip identification devices. That is, the system is operable to identify gaming chips in both the gaming chip holding area and the wagering area. Therefore, the system double checks or verifies each player's gaming activity.

In one embodiment, the system associates the gaming activity directly with players via player accounts. For example, at the start of play, the player logs into the player tracking system, such as by inserting a player tracking card into a card reader associated with their player station on the gaming table. In this embodiment, the intelligent table system associates any tracked data with the player's specific account. Thus, in certain embodiments, tracking player activity at the gaming table is similar in accuracy and thoroughness to the tracking done at slot machines.

Alternatively, the system determines the gaming chip count at each player station. That is, the system enables players to play anonymously and be associated with their current place at the table. For example, a player does not have to log in for one or more plays of a game but rather remains at a same player station for such plays of the game. The system associates the gaming chips with the player stations.

In certain embodiments, the intelligent table system includes one or more card readers or a card reading system. The card reading system knows what card comes out of the shoe and is dealt to what player. In one embodiment, the card reading system is a part of the intelligent table system. In another embodiment, the card reading system is separate from the intelligent table system and in association with the intelligent table system detects betting patterns and decisions to provide to the player tracking system. Such betting patterns and decisions may qualify the player to win one or more bonus awards. The card reading system can also reduce dealer error and or possible corruption by making sure that the players are paid properly for each and every hand. In certain embodiments, the intelligent table system knows the player cards, the dealer cards, and the bet, the intelligent table system is enabled to determine correct payouts for each and every player at the gaming table. In certain embodiments, the system employs safeguards to make sure the correct payout is made. For example, the system can send a halt play signal if an error is detected. It should be appreciated that in different embodiments the card reading system and the intelligent table system are integrated with or included in one or more tracking systems or player tracking systems.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary, a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A system comprising:

a processor; and a memory device that stores a plurality of instructions that, when executed by the processor following a plurality of physical playing cards dealt in association with a play of a game at a gaming table, cause the processor to:

capture visual data associated with the plurality of physical playing cards dealt at the gaming table, and responsive to the plurality of physical playing cards comprising a designated physical playing card associated with a plurality of first attributes, for a first gaming terminal remote from the gaming table:

select one first attribute of the plurality of first attributes of the designated physical playing card, modify the captured visual data based on the one selected first attribute of the plurality of first attributes, and communicate the modified captured visual data to the first gaming terminal, wherein responsive to receipt of the modified captured visual data, the first gaming terminal causes a display, by a display device and in association with the play of the game at the gaming table, of an image of the designated physical playing card associated with the one selected first attribute.

2. The system of claim 1, wherein the plurality of first attributes comprise a plurality of ranks of the designated physical playing card.

3. The system of claim 2, wherein the memory device stores a plurality of further instructions that, when executed by the processor responsive to the designated physical playing card being associated with a plurality of suits, cause the processor to:

select one suit of the plurality of suits of the designated physical playing card, modify the captured visual data based on the one selected rank and the one selected suit, and communicate the modified captured visual data to the gaming terminal, wherein responsive to receipt of the modified captured visual data, the gaming terminal causes a display, by the display device and in association with the play of the game at the gaming table, of the image of the designated physical playing card associated with the one selected rank and the one selected suit.

4. The system of claim 1, wherein the plurality of first attributes comprise a plurality of suits of the designated physical playing card.

5. The system of claim 1, wherein the plurality of first attributes comprise a plurality of rand and suit combinations of the designated physical playing card.

6. The system of claim 1, wherein the memory device stores a plurality of further instructions that, when executed by the processor responsive to the plurality of physical playing cards comprising the designated physical playing card associated with the plurality of first attributes, for a second, different gaming terminal remote from the gaming table, cause the processor to:

select another first attribute of the plurality of first attributes of the designated physical playing card, modify the captured visual data based on the other selected first attribute of the plurality of first attributes, and communicate the modified captured visual data to the second, different gaming terminal, wherein responsive to receipt of the modified captured visual data, the second, different gaming terminal causes a display, by another display device and in association with the play of the game at the gaming table, of another image of the designated physical playing card associated with the other selected first attribute.

7. The system of claim 6, wherein the one selected first attribute and the other selected first attribute are different first attributes.

8. The system of claim 1, wherein the selection of the one first attribute of the plurality of first attributes of the designated physical playing card occurs after the captured visual data is communicated to the first gaming terminal and the first gaming terminal causes a display, by the display device and in association with the play of the game at the gaming table, of the designated physical playing card associated with the plurality of first attributes.

9. The system of claim 1, wherein the selection of the one first attribute comprises a random selection.

10. A system comprising:

a processor; and a memory device that stores a plurality of instructions that, when executed by the processor following a plurality of physical playing cards dealt in association with a play of a game at a gaming table and responsive to the plurality of dealt physical playing cards comprising a physical playing card having a plurality of ranks displayed on a surface of that physical playing card, cause the processor to:

select one rank of the plurality of ranks of that physical playing card, and communicate data to a gaming terminal remote from the gaming table, wherein responsive to receipt of the data, the gaming terminal causes a display, by a display device and in association with the play of the game at the gaming table, of an image of that physical playing card displaying the selected rank without displaying any non-selected rank of the plurality of ranks.

11. The system of claim 10, wherein the memory device stores a plurality of further instructions that, when executed by the processor responsive to the physical playing card having the plurality of ranks having a plurality of suits displayed on the surface of that physical playing card, cause the processor to:

select one suit of the plurality of suits of that physical playing card, and communicate data to the gaming terminal, wherein responsive to receipt of the data, the gaming terminal causes a display, by the display device and in association with the play of the game at the gaming table, of the image of that physical playing card displaying the selected rank and the selected suit.

12. A method of operating a system, the method comprising:

following a plurality of physical playing cards dealt in association with a play of a game at a gaming table:

capturing visual data associated with the plurality of physical playing cards dealt at the gaming table, and responsive to the plurality of physical playing cards comprising a designated physical playing card associated with a plurality of first attributes, for a first gaming terminal remote from the gaming table:

selecting, by a processor, one first attribute of the plurality of first attributes of the designated physical playing card, modifying, by the processor, the captured visual data based on the one selected first attribute of the plurality of first attributes, and communicating the modified captured visual data to the first gaming terminal, wherein responsive to receipt of the modified captured visual data, the first gaming terminal causes a display, by a display device and in association with the play of the game at the gaming table, of an image of the designated physical playing card associated with the one selected first attribute.

13. The method of claim 12, wherein the plurality of first attributes comprise a plurality of ranks of the designated physical playing card.

14. The method of claim 13, further comprising, responsive to the designated physical playing card being associated with a plurality of suits:

selecting, by the processor, one suit of the plurality of suits of the designated physical playing card, modifying, by the processor, the captured visual data based on the one selected rank and the one selected suit, and communicating the modified captured visual data to the gaming terminal, wherein responsive to receipt of the modified captured visual data, the gaming terminal causes a display, by the display device and in association with the play of the game at the gaming table, of the image of the designated physical playing card associated with the one selected rank and the one selected suit.

15. The method of claim 12, wherein the plurality of first attributes comprise a plurality of suits of the designated physical playing card.

16. The method of claim 12, wherein the plurality of first attributes comprise a plurality of rand and suit combinations of the designated physical playing card.

17. The method of claim 12, further comprising, responsive to the plurality of physical playing cards comprising the designated physical playing card associated with the plurality of first attributes, for a second, different gaming terminal remote from the gaming table:

selecting, by the processor, another first attribute of the plurality of first attributes of the designated physical playing card, modifying, by the processor, the captured visual data based on the other selected first attribute of the plurality of first attributes, and communicating the modified captured visual data to the second, different gaming terminal, wherein responsive to receipt of the modified captured visual data, the second, different gaming terminal causes a display, by another display device and in association with the play of the game at the gaming table, of another image of the designated physical playing card associated with the other selected first attribute.

18. The method of claim 17, wherein the one selected first attribute and the other selected first attribute are different first attributes.

19. The method of claim 12, wherein the selection of the one first attribute of the plurality of first attributes of the designated physical playing card occurs after the captured visual data is communicated to the first gaming terminal and the first gaming terminal causes a display, by the display device and in association with the play of the game at the gaming table, of the designated physical playing card associated with the plurality of first attributes.

20. The method of claim 12, wherein the selection of the one first attribute comprises a random selection.

* * * * *